(12) United States Patent
Kremer (10) Patent No.: US 11,383,840 B2
(45) Date of Patent: Jul. 12, 2022

(54) VARIABLE TRANSPARENCIES APPLIED TO AIRCRAFT SEATS

(71) Applicant: Safran Seats USA LLC, Gainesville, TX (US)

(72) Inventor: Paul Kremer, La Celle Saint Cloud (FR)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/272,628

(22) PCT Filed: Sep. 7, 2018

(86) PCT No.: PCT/IB2018/056846
§ 371 (c)(1),
(2) Date: Mar. 1, 2021

(87) PCT Pub. No.: WO2020/049345
PCT Pub. Date: Mar. 12, 2020

(65) Prior Publication Data
US 2021/0371107 A1    Dec. 2, 2021

(51) Int. Cl.
*B64D 11/00*    (2006.01)
(52) U.S. Cl.
CPC .. *B64D 11/00151* (2014.12); *B64D 11/00153* (2014.12)
(58) Field of Classification Search
CPC ............... B54D 11/00151; B64D 11/00153
See application file for complete search history.

(56) References Cited

U.S. PATENT DOCUMENTS

| 2005/0268319 | A1 | 12/2005 | Brady, Jr. |
| 2012/0139308 | A1 | 6/2012 | Westerink et al. |
| 2017/0283065 | A1 | 10/2017 | Papke et al. |
| 2021/0063783 | A1* | 3/2021 | Byoun ............ B60R 1/00 |

FOREIGN PATENT DOCUMENTS

| WO | 2007093327 A1 | 8/2007 |
| WO | 2010045411 A1 | 4/2010 |
| WO | 2010144420 A1 | 12/2010 |

OTHER PUBLICATIONS

International Patent Application No. PCT/IB2018/056846, International Search Report and Written Opinion, dated Apr. 29, 2019.
"Shades Are So 2015. These Airplaine Windows Tint Themselves," Jul. 27, 2018, http://www.wired.com/2016/04/shades-2015-airplane-windows-tint/.

* cited by examiner

*Primary Examiner* — Anthony D Barfield
(74) *Attorney, Agent, or Firm* — Kilpatrick Townsend & Stockton LLP (57) ABSTRACT

The field of this disclosure relates to the use of variable transparency technology on aircraft seats. Specifically, there is described a system that uses a transparent material that can be transitioned to become more opaque upon application of a voltage. The transparent material may be used for privacy purposes, may be used to create a video screen on a selected surface, or for other uses described herein.

14 Claims, 6 Drawing Sheets

VARIABLE TRANSPARENCIES APPLIED TO AIRCRAFT SEATS

FIELD OF THE INVENTION

The field of this disclosure relates to the use of variable transparency technology on aircraft seats. Specifically, there is described a system that uses a transparent material that can be transitioned to become more opaque upon application of a voltage. The transparent material may be used for privacy purposes, may be used to create a video screen on a selected surface, or for other uses described herein.

BACKGROUND

Many vehicles such as passenger aircraft, buses, trains, ships, automobiles, and the like include seats for bearing traveling passengers en route to a destination. A number of factors affect the design and layout of such passenger seats. For example, vehicle passenger seats are subject to safety requirements established by governments or other standard-setting organizations. Passenger comfort is also an important consideration in seat design. For example, in aircraft designed for long haul flights, many passenger seats are designed to fully recline in order to allow passengers to rest. Some seats are also provided with seat shells that deliver enhanced privacy. In some examples, the seat shells may have physical dividers that provide a barrier between the passenger and the aircraft aisle.

Some passenger seats provide video and audio entertainment, including television, video games, internet access, and other in-flight entertainment options presented on in-flight entertainment ("IFE") units. Many passenger seats provide an IFE unit positioned in front of the passenger. In some examples, the IFE unit is positioned on a seat back, designed for viewing by the passenger in the seat immediately behind. In other examples, the IFE unit is positioned within a seat shell and configured to swivel outwardly for passenger viewing. In other examples, the IFE unit is mounted in the armrest of the passenger seat. In other examples, the IFE unit is positioned on an aircraft monument or other structure positioned immediately forward of a passenger. The location of the IFE unit with respect to the seat and passenger may be varied depending upon aircraft layout. IFE units are typically individually passenger-controlled, but may also be controlled collectively via a master controller (for example, for delivering the introductory flight safety message to all IFE units on-board or to shut down all IFE units upon flight completion).

Improvements to passenger privacy and entertainment monitors are desirable.

SUMMARY

Accordingly, the present inventors have designed an improved in-flight entertainment unit screen. The screen can be provided in an initially transparent state, such that whatever surface on which it is positioned is viewable therethrough. When video or other content viewing is desired, the screen can be switched to an opaque or non-translucent state, such that it creates a white screen on which a video or other electronic image or content may be viewed.

The terms "invention," "the invention," "this invention" "the present invention," "disclosure," "the disclosure," and "the present disclosure," used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of this disclosure, there may be provided a passenger seat in-flight entertainment unit, comprising: a variable transparency panel positioned with respect to a passenger's line of sight, in an in-flight entertainment unit position, the variable transparency panel having a first condition in which the panel is transparent and a second condition in which the panel is made at least partially opaque via application of a voltage to the panel, wherein, in the second condition, the panel functions as a screen for displaying content.

The in-flight entertainment unit may be used in connection with a projector configured to display content onto the panel. The panel may be secured anywhere appropriate, such as being secured to a forward seat's seatback, or being secured to a rotating arm configured to move the panel with respect to a seated passenger.

The variable transparency panel may be glass, plastic, acrylic, polycarbonate, polystyrene, cellulose, crystal, ceramic, lacquer, urethane, epoxy, resin, or any combination thereof. The variable transparency panel may be electro-chromatic or smart glass.

Embodiments also relate to a method for viewing entertainment content from a passenger seat, comprising: activating the in-flight entertainment unit of claim 1 from a transparent condition to a non-transparent condition; and projecting viewing content on the in-flight entertainment unit. In some examples, activating the in-flight entertainment unit from a transparent condition to a non-transparent condition may comprise application of a voltage to the panel. Activating the in-flight entertainment unit from a transparent condition to a non-transparent condition may comprise activating a user-controlled panel to turn the panel white.

DETAILED DESCRIPTION

The described embodiments provide an improved in-flight entertainment (IFE) unit screen. Embodiments also provide enhanced privacy options for passenger seating using similar technology as that described for the IFE unit screens. The screen can be provided in an initially transparent state, such that whatever surface on which it is positioned is viewable therethrough. When video or other content viewing is desired, the screen can be switched to an opaque or non-translucent state, such that it creates a white screen on which a video or other electronic image or content may be viewed.

Figure 1:
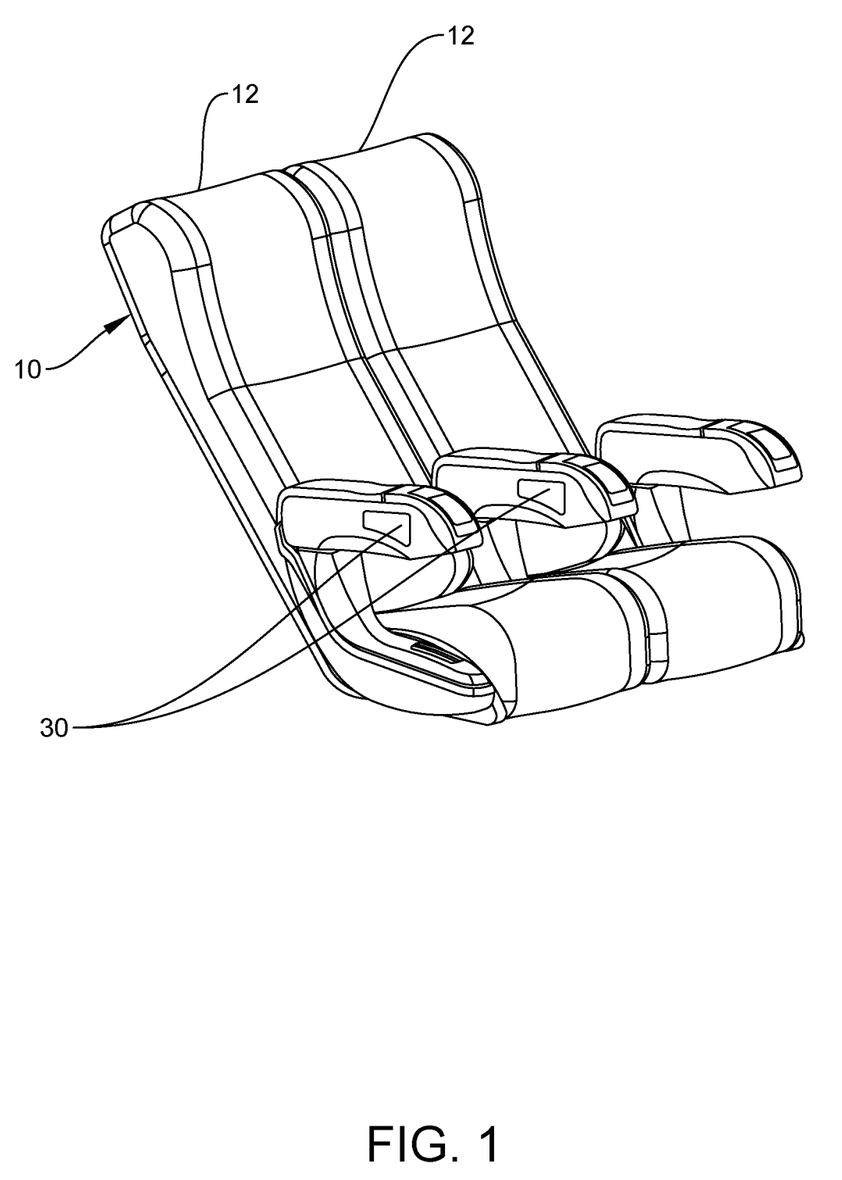
FIG. 1 is a side perspective view of a passenger seat system.
Figure 2:
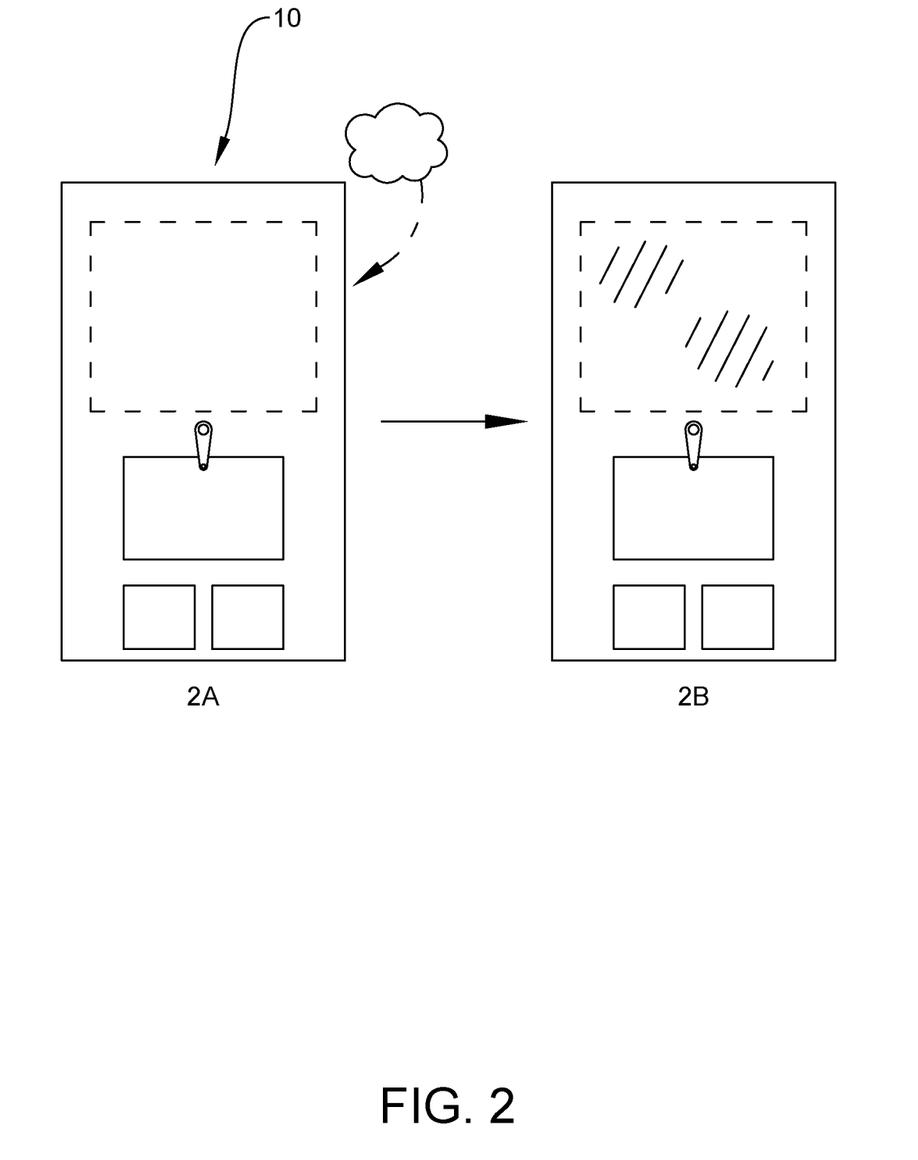
FIG. 2A is a rear plan view of one of the passenger seats of FIG. 1 having a variable transparency unit secured to a back portion thereof.
FIG. 2B shows the variable transparency unit of FIG. 2A in a non-transparent condition.

FIG. 1 illustrates side-by-side passenger seats 12, each having a screen unit 10 positioned on a back portion thereof. FIGS. 2A and 2B illustrate one of the units 10 as it is transitioned from transparent to opaque. In FIG. 2A, the unit 10 is transparent. In this configuration, it may be possible to see the seat back (or whatever surface on which the unit 10 positioned) through the transparent layer(s) of the unit 10. Once transitioned to opaque as shown in FIG. 2B (in many instances, the transfer preferably changes to screen to white for optimized content viewing), the unit 10 functions as a viewing screen. Content may be displayed on screen as described below.

The transparent material or layer(s) of the unit 10 may be any type of regulatory approved material that allows light transmission therethrough. Non-limiting examples of potential materials for use include glass, plastic, acrylic, polycarbonate, polystyrene, cellulose, crystal, ceramic, lacquer, urethane, epoxy, resin, or any combination thereof. In a specific example, the transparent material may include one or more layers of electronic glass or electrochromatic glass, which can adjust an amount of transparency based on an applied voltage. It is also possible for any of the above materials to be designed to exhibit voltage-applied darkening or color-changing features.

FIG. 2A shows the unit 10 secured to a seat back, in its transparent state. In this instance, the rear of the seatback 14 is viewable through the unit 10. Once video or other content viewing is desired, the unit 10 may be switched to opaque, white, non-transparent, or any other non-translucent state, as shown by FIG. 2B. In most instances, the unit 10 has at least one portion manufactured of electronic glass (which may also be referred to as "switchable glass," "electrochromatic glass," or "smart glass"). Although referred to herein as "glass," it should be understood that the material may be a plastic, polymer, acrylic, or any other type of translucent material that can switch its transparency upon application of a voltage. For example, it is possible for a film or layer to provide the switchable nature. It is possible for one or more layers of glass or other material to provide the switchable nature. Those of ordinary skill in the art will understand what materials may be used and what manufacturers provide such types of technology.

In use, it has been found that in order to provide the highest video or other content viewing experience, the base screen should be white or other light color. By using the electric glass technology described herein, it is possible to provide an optimal passenger viewing screen. The screen is switchable between transparent and opaque, depending upon current usage.

The unit 10 may be applied to the surface using any appropriate adhesive, mechanical fastener, quarter turn locks, or other securement system, or any combination thereof. The securement system used may end upon the materials of the unit, as well as materials of the surface to which it is to be applied.

Figure 3:
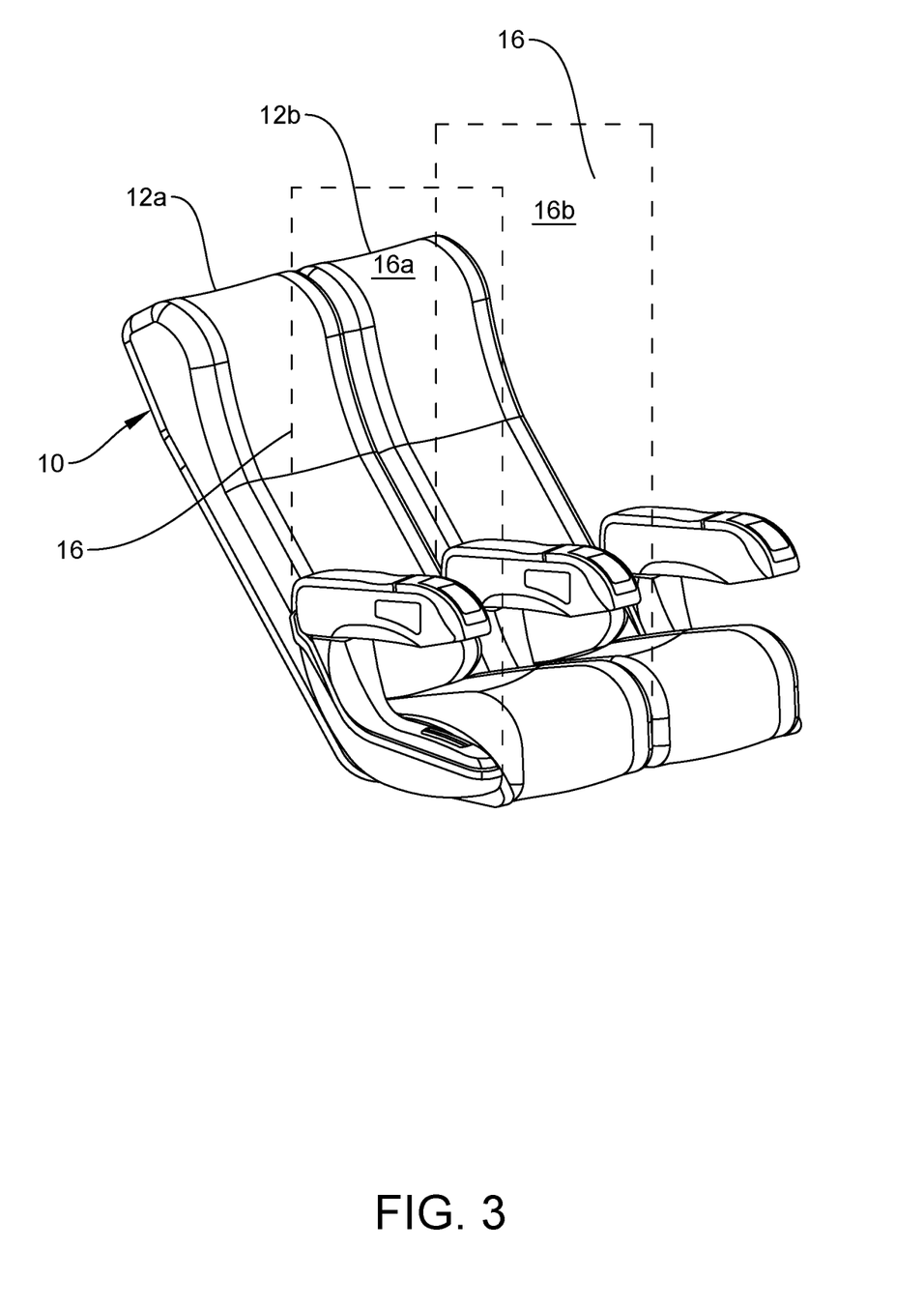
FIG. 3 shows a side perspective view of a passenger seat system with privacy panels.

As illustrated by FIG. 3, it is also possible to provide one or more privacy panels 16 using similar technology. For example, privacy panels 16 may be raised from a side area of one of the seats 12. This may be used to block a passenger from the aisle, as shown by privacy panel 16a on seat 12a in FIG. 3. It is also possible for a privacy panel 16b to be positioned between seats 12a and 12b, as shown. This may be used to provide privacy between individual passengers. Each privacy panel 16 may be raised or lowered via individual controls. It is also possible for a plurality of privacy panels 16 to be controlled by a master controller, such that flight attendants can manage raising or lowering of all privacy panels at one time. The privacy panels 16 may be manufactured of the electrochromatic or electric glass (or other material) technology described above. For example, when not activated, the privacy panel 16 may be transparent or otherwise see-through. When raised and activated, the privacy panel 16 may be used as a viewing screen as described above. Additionally or alternatively, the privacy panel 16 may simply be used as a divider. It may be activated with various color and/or light options, as described in more detail below.

Figure 4:
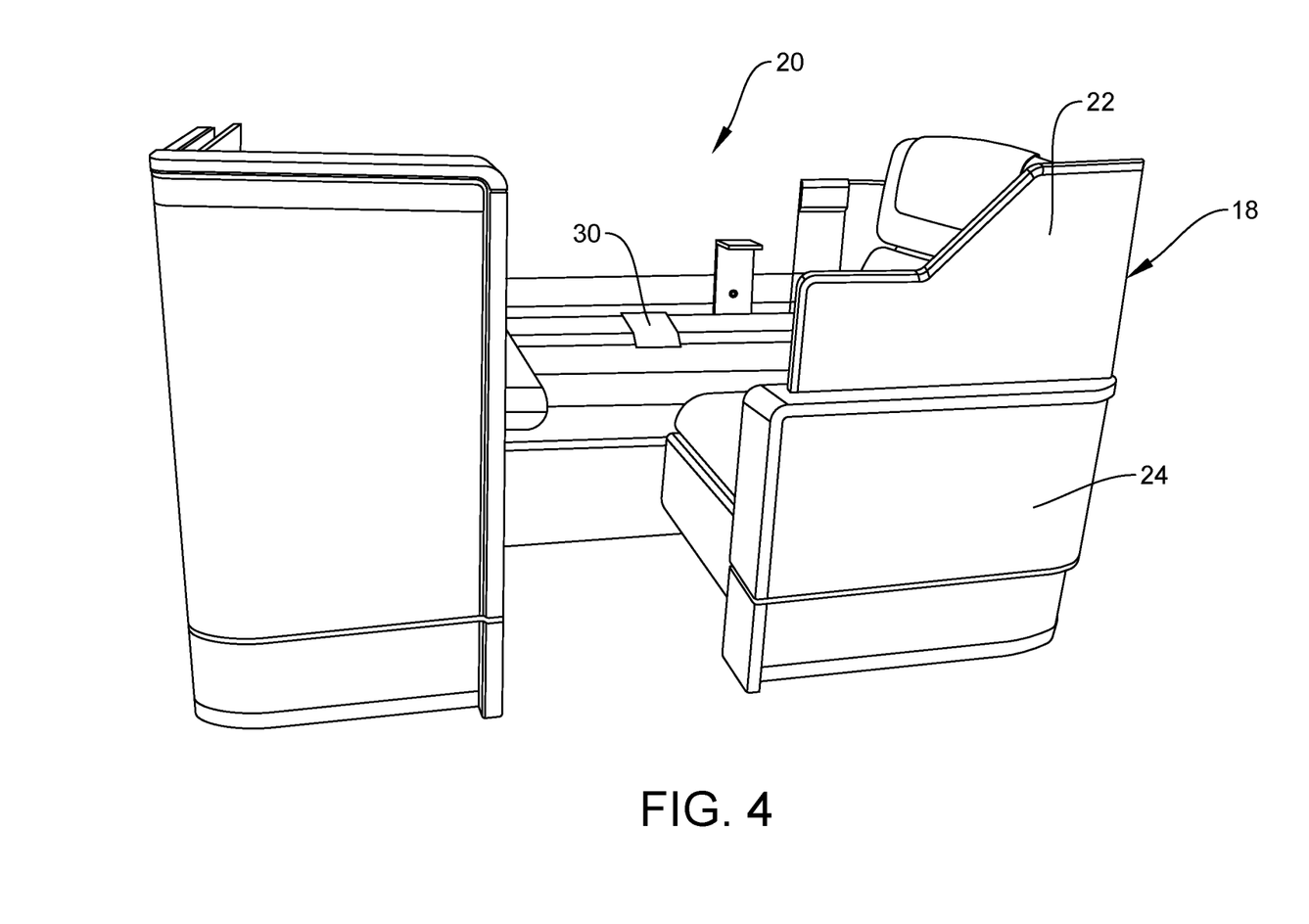
FIG. 4 shows a business or first class seat having a seat shell and a privacy panel system.

FIG. 4 illustrates an alternate embodiment of a privacy panel system 18 used in connection with a business class or first class seat 20. In this example, a privacy panel 22 is raised or lowered from a seat shell 24. This can allow the passenger to lower the panel 22 for various taxi, take-off, and landing (TTL) situations or for cabin service, but to raise the panel 22 when additional privacy is desired. As with the economy class privacy panel 16 described above, privacy panel 22 may use the electrochromatic or electric glass (or other material) technology described herein. This can allow the passenger to manage the amount of light that is transmitted into the seating area. When raised and activated, the privacy panel 22 may be used as a viewing screen as described above. Additionally or alternatively, the privacy panel 22 may simply be used as a divider. It may be activated with various color and/or light options, as described in more detail below.

Figure 5:
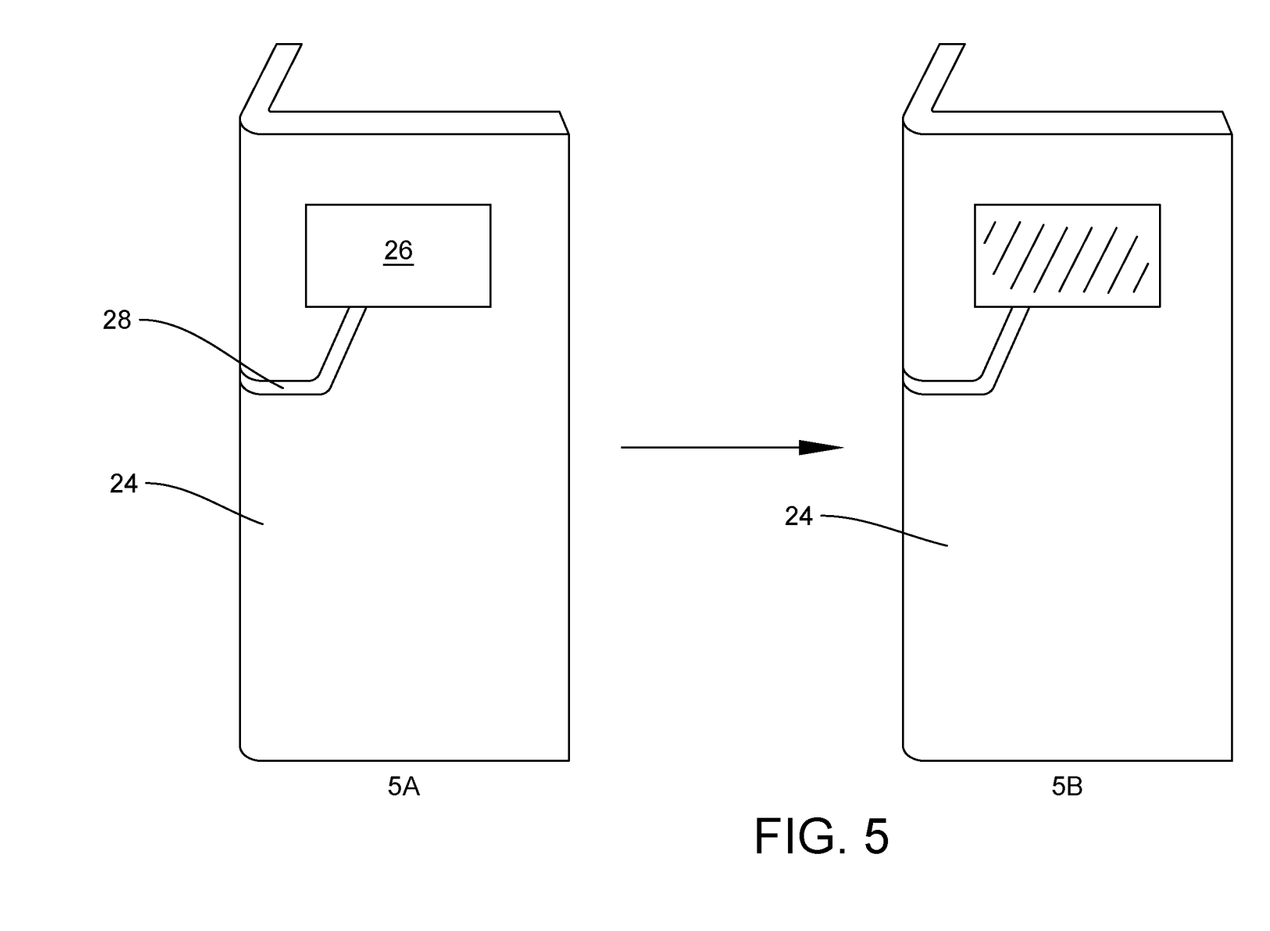
FIG. 5A shows a seat shell having a variable transparency unit/panel in a transparent condition.
FIG. 5B the variable transparency unit/panel of FIG. 5A in a non-transparent condition.

FIG. 5 illustrates an alternate IFE screen option for a business class seat that has a seat shell enclosure 24. In this example, a translucent panel 26 is secured to a rotating arm 28, which allows the passenger to alter the location of the panel 26. (It should also be understood that the panel 26 may be positioned directly onto the seat shell enclosure 24 itself, without the use of a rotating arm 28. If this configuration is used, the panel 28 may be secured directly to the seat shell surface as described above in connection with seatback units 10.) When not in use, the panel 26 is transparent, as illustrated by FIG. 5A. It does not obstruct vision or block viewing therethrough. When video or other content viewing is desired, the translucent panel 26 may be activated to switch to a white, non-clear, or other non-transparent configuration, as illustrated by FIG. 5B. This can allow a sleek look to the seat shell 24, such that an IFE unit is not installed and always viewable. However, when the passenger desires video or other content viewing, the translucent panel 26 turns into a viewing screen upon the touch of a button.

In order to allow passenger viewing on any of the screens or panels described herein, a projector may deliver content from above the screen or panel, the side of the screen or panel, below the screen or panel, or behind the screen or panel, depending upon which technology is engaged, and upon which type of seat is used. The projector may be any type of projector that can deliver an image to a screen. In one example, the projector is a video projector.

One advantage of this technology is that the cost of providing an individual IFE unit at each seat can be reduced. Additionally, projectors and screens may be easier to maintain and replace. Further, the disclosed technology is not positioned in the passenger's head path. Thus, in case of accident, there may be an improved safety aspect in having only a flat and rather passive surface in front of the passenger, rather than a heavy IFE screen.

In one example, the transparent screen/panel/unit systems include a control system that delivers a voltage or other activation power to the transparent surface. For example, when voltage is applied to an electronic glass technology, the surface becomes darkened, more opaque, colored, unclear, a varied amount of transparency, or otherwise less transparent or less translucent, based on the applied voltage supplied. The voltage applied may be electric. Exemplary technologies operate by changing state via an electrical current and include but are not limited to smart glass, i.e., technologies associated with molecules changing orientations under application of electrical fields.

Other options work via electrochromic coatings. For examples, the status of the screen switches based on one or more light sensitive coatings (consider, for example, UV reactive glasses darkening when exposed to sunlight). In a further embodiment, it is possible that the he voltage may activate a magnetic field to align suspended particles within the transparent system. The voltage may activate a chemical reaction. The voltage may work in any other appropriate way designed for electronic or electrochromatic glass (or other material) technology. It is understood that one of ordinary skill in smart glass and related technologies would understand how to implement current and future technologies into this disclosure.

It is possible for a pre-determined setting to be set, such as levels of darkness or levels of brightness. In other examples, the control system may incorporate an illumination option that is configured to direct light and/or voltage onto the transparent panel. The illumination option may include one or more light emitting diodes (LEDS) configured to emit light and illuminate the transparent panel. This can give the cabin an interesting and elegant look, while still maintaining the transparency of the transparent panel for safety or other purposes. In a specific embodiment, the illumination system may be accompanied by a controller 30 that allows the passenger to modify the color and/or the voltage applied to the transparent panel. In use, if a passenger desires a particular color glow, for example, the color and/or brightness level may be selected. If a passenger desires a bright light for reading, that may be selected. On the other hand, if a passenger desires a darkened panel for resting or sleeping, a darkened option may be selected. It may also be possible to allow passengers to select identified colors of illumination that will convey information to flight attendants, such as "do not disturb," "flight attendant call," "wake for next meal," and so forth.

A passenger control 30 area may be provided, which includes a control panel with various lighting/opacity/transparency options. The control panel may be located on an armrest (as shown by FIG. 1), overhead, in front of the passenger such as on an in-flight entertainment (IFE) unit video screen, alongside or within a passenger table area or console (as shown in FIG. 4), via a remote control, via a personal electronic device or table. The information may be relayed wired or wirelessly.

It is also possible for a master controller to override any individual seat controls. For example, there are some instances during flight when regulations require that flight attendants have direct line of sight to each passenger, such as during taxi, take-off, and landing (TTL). In such situations, the master controller may be used to control all panels as a set, rendering all screens or panels back to an original transparent condition. In another example, the master controller may sense light characteristics within the aircraft cabin such that all panels are caused to be darkened when the light within the cabin is below a specified threshold, e.g., when the sun sets or when the cabin lights are dimmed. The presence of the transparent screens panels can promote a feeling of spaciousness in the aircraft cabin that would otherwise normally feel constricted due to various privacy screen options. However, when the transparent screens or panels are activated via voltage or other illumination, the benefits of increased privacy may be achieved. In some examples, the panels provide additional privacy to the passenger while still allowing light to pass through, such that the panels are rendered at least semi-opaque or at least semi-transparent.

In another example, if a passenger desires to use the transparent panel as a video screen as well as to provide the privacy options described, that option may similarly be selected. In one example illustrated by FIG. 6, it is possible to provide a two-part panel 32. In this example, at least one layer 34 of the panel 32 provides an opaque or otherwise darkened surface when activated. This is typically the layer that faces away from the passenger. For example, the darkened surface may be black or otherwise non-transparent for privacy and light blockage. (This may help maintain a dim lighting experience in the cabin, helping to offset bright light from video content being viewed by passengers.) The second layer 36, the layer facing the passenger, may be used as a viewing screen as described above. For example, the screen may be made white or lighter than the rear layer 34, in order to provide an optimal viewing experience screen. In addition to the two-part panel described, it should be understood that multilayer panels may be provided having triple or even more panels. This embodiment may help to provide enhanced light blockage. Multi-panel embodiments may use different materials for differing panels.

Figure 6:
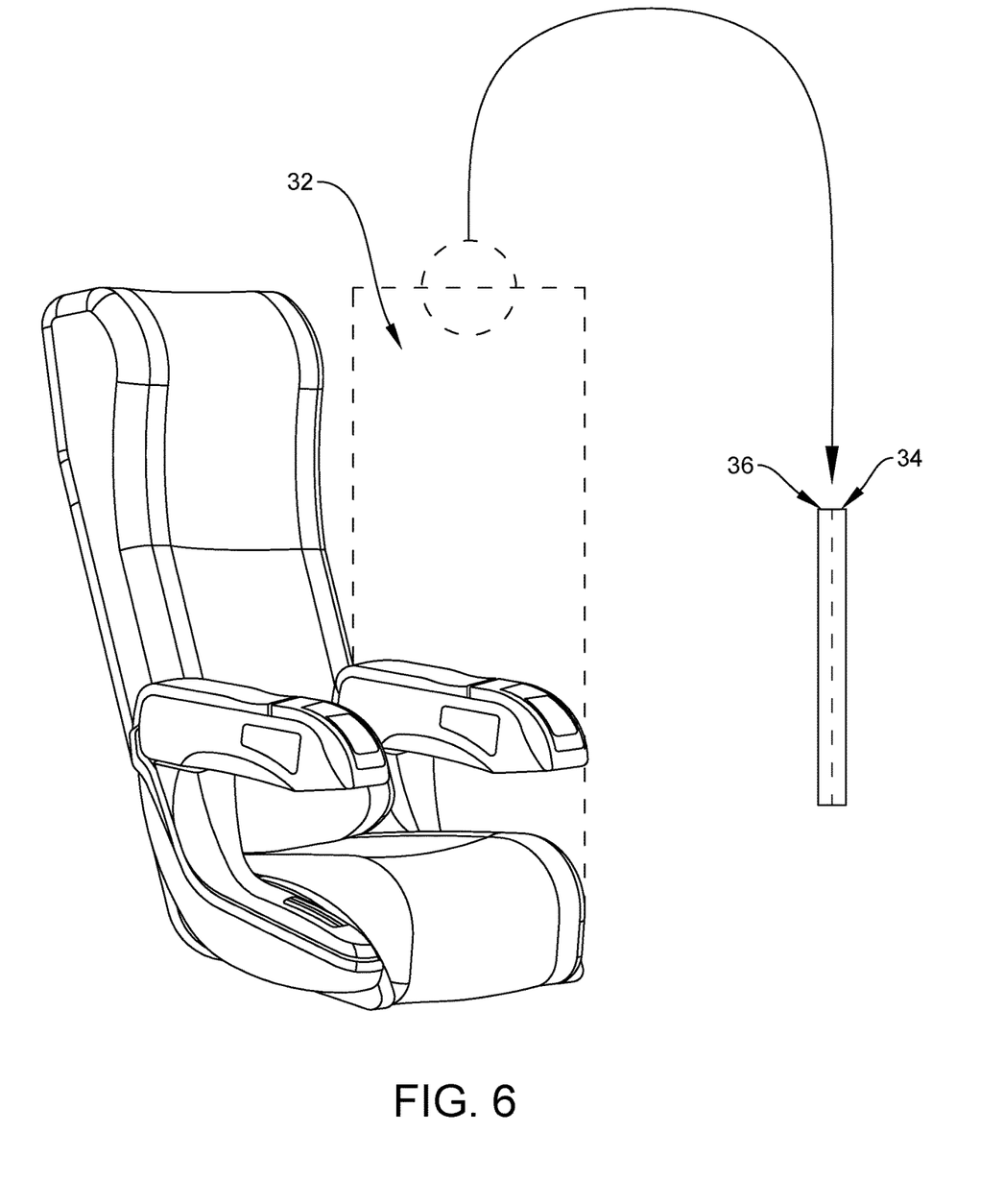
FIG. 6 shows a side perspective and cross sectional view of a multi-panel system.

Additionally or alternatively, the panel may be adhered to a black/limited light diffusing surface. If projection of viewing content is desired, the black/limited light diffusing surface is not optimal, so a passenger-facing panel 36 may be transitioned to white for viewing.

Various coatings may be applied to the surfaces of any of the screens or panels described herein. For example it is possible to provide an anti-reflective coating which may provide a better image viewing experience. In an alternate example, it is possible to provide a diffusing surface that can help provide a better image on the panel.

In the following, further examples are described to facilitate the understanding of the disclosure of this invention:

Example A. In one example, there is provided a passenger seat in-flight entertainment unit, comprising: a variable transparency panel positioned with respect to a passenger's line of sight, in an in-flight entertainment unit position, the variable transparency panel having a first condition in which the panel is transparent and a second condition in which the panel is made at least partially opaque via application of a voltage to the panel, wherein, in the second condition, the panel functions as a screen for displaying content.

Example B. The seat of any of the preceding or subsequent examples, further comprising a projector configured to display content onto the panel.

Example C. The seat of any of the preceding or subsequent examples, wherein the panel is secured to a forward seat's seatback.

Example D. The seat of any of the preceding or subsequent examples, wherein the panel is secured to a rotating arm configured to move the panel with respect to a seated passenger.

Example E. The seat of any of the preceding or subsequent examples, wherein, in the second condition, the panel is activated to white.

Example F. The seat of any of the preceding or subsequent examples, wherein the panel is individually controlled such that each passenger controls viewing content.

Example G. The seat of any of the preceding or subsequent examples, wherein the panel is controlled via a master controller.

Example H. The seat of any of the preceding or subsequent examples, wherein the variable transparency panel comprises a multi-panel system.

Example I. The seat of any of the preceding or subsequent examples, wherein the variable transparency panel comprises a first variable transparency panel and further comprising a second variable transparency panel associated with the first variable transparency panel, wherein the second variable transparency panel is configured to provide light blockage for the first variable transparency panel.

Example J. The seat of any of the preceding or subsequent examples, wherein the first variable transparency panel comprises a passenger-facing panel that functions as a viewing screen and wherein the second variable transparency panel is configured to be darkened to provide light blockage for the first variable transparency panel.

Example K. The seat of any of the preceding or subsequent examples, further

Example L. The seat of any of the preceding or subsequent examples, wherein the variable transparency panel comprises glass, plastic, acrylic, polycarbonate, polystyrene, cellulose, crystal, ceramic, lacquer, urethane, epoxy, resin, or any combination thereof.

Example M. The seat of any of the preceding or subsequent examples, wherein the variable transparency panel comprises electrochromatic or smart glass.

Example N. The seat of any of the preceding or subsequent examples, wherein the variable transparency panel is adhered to a surface using an adhesive, a mechanical fastener, quarter turn locks, or any combination thereof.

Example O. The seat of any of the preceding or subsequent examples, wherein the variable transparency panel comprises one or more light emitting diodes configured to change colors of the panel.

Example P. There is also provided a method for viewing entertainment content from a passenger seat, comprising: activating the in-flight entertainment unit of any of the preceding examples from a transparent condition to a non-transparent condition; and projecting viewing content on the in-flight entertainment unit.

Example Q: The method of any of the preceding or subsequent examples, wherein activating the in-flight entertainment unit from a transparent condition to a non-transparent condition comprises application of a voltage to the panel.

Example R: The method of any of the preceding or subsequent examples, wherein activating the in-flight entertainment unit from a transparent condition to a non-transparent condition comprises activating a user-controlled panel to turn the panel white.

The subject matter of certain embodiments of this disclosure is described with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

It should be understood that different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A privacy panel configured to be positioned between passenger seats or on a seat shell, the privacy panel comprising:
    a variable transparency panel having a first condition in which the panel is transparent and a second condition in which the panel is made at least partially opaque via application of a voltage to the panel,
    wherein, in the second condition, the panel functions as a screen for displaying content,
    wherein the variable transparency panel comprises a first variable transparency panel and a second variable transparency panel associated with the first variable transparency panel,
    wherein the second variable transparency panel is configured to provide light blockage for the first variable transparency panel,
    wherein the first variable transparency panel comprises a passenger-facing panel that functions as a viewing screen and wherein the second variable transparency panel is configured to be darkened to provide light blockage for the first variable transparency panel.

2. The in-flight entertainment unit of claim 1, further comprising a projector configured to display content onto the panel.

3. The in-flight entertainment unit of claim 1, wherein the panel is secured to a forward seat's seatback.

4. The in-flight entertainment unit of claim 1, wherein the panel is secured to a rotating arm configured to move the panel with respect to a seated passenger.

5. The in-flight entertainment unit of claim 1, wherein, in the second condition, the panel is activated to white.

6. The in-flight entertainment unit of claim 1, wherein the panel is individually controlled such that each passenger controls viewing content.

7. The in-flight entertainment unit of claim 1, wherein the panel is controlled via a master controller.

8. The in-flight entertainment unit of claim 1, wherein the variable transparency panel comprises glass, plastic, acrylic, polycarbonate, polystyrene, cellulose, crystal, ceramic, lacquer, urethane, epoxy, resin, or any combination thereof.

9. The in-flight entertainment unit of claim 1, wherein the variable transparency panel comprises electrochromatic or smart glass.

10. The in-flight entertainment unit of claim 1, wherein the variable transparency panel is adhered to a surface using an adhesive, a mechanical fastener, quarter turn locks, or any combination thereof.

11. The in-flight entertainment unit of claim 1, wherein the variable transparency panel comprises one or more light emitting diodes configured to change colors of the panel.

12. A method for viewing entertainment content from a passenger seat, comprising:
   activating the in-flight entertainment unit of claim 1 from a transparent condition to a non-transparent condition; and
   projecting viewing content on the in-flight entertainment unit.

13. The method of claim 12, wherein activating the in-flight entertainment unit from a transparent condition to a non-transparent condition comprises application of a voltage to the panel.

14. The method of claim 12, wherein activating the in-flight entertainment unit from a transparent condition to a non-transparent condition comprises activating a user-controlled panel to turn the panel white.

* * * * *